Patented Feb. 14, 1950

2,497,367

UNITED STATES PATENT OFFICE 2,497,367

METHOD FOR PRODUCING OIL AND MEAL FROM FISH OFFAL

Olav Notevarp, Bergen, Norway, assignor to Aktieselskapet Stord, Lervik, Norway, a concern of Norway No Drawing. Application November 20, 1946, Serial No. 711,222. In Norway January 26, 1942

4 Claims. (Cl. 99—2)

In the usual method of treatment of fat fish, such as herring, for obtaining meal and oil, the raw material is heated by means of hot water or steam and is afterwards pressed in order to remove a substantial part of the water and oil or fat. In other methods the water is first removed by heating, preferably in vacuum, whereupon the fat is pressed out of the dehydrated material.

The first method has the drawback that the water pressed out contains considerable quantities of water soluble matters, in the case of fish products chiefly proteins, which it is difficult or unprofitable to extract and which therefore constitutes a loss. The latter usually amounts to 20% or more of the total quantity of protein in the raw material. This loss is avoided by a more or less complete desiccation before pressing. Methods working on this principle, however, have the drawback that vacuum apparatus are preferably employed in order to prevent too strong an action of the air on the fat and too intense a heating, and also that it is difficult to get the fat pressed out of the dried material. They have therefore found only a very limited application.

In order to avoid difficulties in the pressing of dried material, it has been proposed to employ a very high pressure—50 to 250 kg. per square centimetre; in this case the material has been dried down to a maximum water content of 20%, the minimum being 12–15%.

Another previously proposed method consists in drying the material so that the water content is brought down to a range between 40 and 20%. A water content of 25 and 30% is said to be especially advantageous for the pressing.

According to the present invention the product is dried to a considerably less extent as it has been found that if the material is dried to a water content of from 55% to 40% substantial advantages are obtained. It is then possible to remove the oil with a much lower pressure, and the residue contains extremely little fat, the oil is of good quality and the loss in proteins very small. If the drying of the material is carried only so far that the water content lies within the above-mentioned limits, relatively little water is pressed out of the dried material together with the oil. The quantity of expressed water amounts to only about 10%, or at most 20% of the quantity contained in the material pressed. The small quantity of water that is pressed out is however rich in solids (usually 20% or more). It can advantageously be mixed with the mass that goes into the dryer and thus be fully utilized.

*Example*

Herring normally containing 12% of oil and 68% of water is dried in an ordinary desiccator until the water content is about 45%, in such manner that the temperature of the material has risen to 60–90° C., when it leaves the desiccator. Immediately after the drying, preferably after suitable heating up to 60–90%, the material is subjected to pressure in a continuous screw-press or other suitable press. An ordinary good pressing gives a product with a content of about 4% of fat and 40–45% of water. The pressed material is then further dried in a special desiccator and thereupon is ground into meal, while the oil is subjected to purification in separators, centrifuges or in any other suitable manner.

The nutritive value of the meal and the oil is better secured and preserved by this process than by the ordinary method. When the raw material in the usual process is heated or boiled so that the proteins coagulate before pressure is applied, certain changes take place which are unfavourable as regards the nutritive value and keeping qualities of the meal and fat. For the water removed by pressing contains, besides water-soluble organic nutriments, vitamins and salts and also substances which seem to have a protective influence against the tendency of the oil or fat becoming rancid, as well as upon the fat-soluble vitamins.

According to the invention the fat-containing material may be processed by using many different methods of drying and pressing. The material may be heated more or less intensely during the process of drying or before the pressing, so that the best conditions for the particular material can be secured in each separate case. In carrying the method into effect, use may be made of any suitable means to regulate or increase the compressibility of the mass, such as salts, pH regulation and the like.

It will be understood that the term fish as used herein may include whole fish or portions thereof which contain oil such as waste or offal but does not include the exclusive use of fish material containing 40% of water or less, as plain fat fish livers containing about 50% or more of oil.

I claim:

1. Method of producing fishmeal and oil from fish comprising reducing the moisture content of the fish to the range of 40 to 55% of moisture, pressing the fish material after proper heating to remove a liquid containing the oil and then drying the pressed fish residue.

2. Method of producing fishmeal and oil from fish comprising reducing the moisture content of the fish to the range of 40 to 55% of moisture, heating the fish material to a temperature in the range of 60 to 90° C., pressing the fish material to remove a liquid containing the oil and then drying the pressed fish residue.

3. Method of producing fishmeal and oil from fish comprising reducing the moisture content of the fish to the range of 40 to 55% of moisture, pressing the fish material after proper heating to expel a liquid comprising oil and a water solution of fish solubles, separating the water solution from the oil and drying both the separated water solution and the pressed fish residue.

4. The method of producing fish meal and oil from fish comprising first heating the fish to a temperature in the range of 60 to 90° C., then reducing the moisture content thereof to the range of 40 to 55% and then pressing the fish material to remove the water and oil contained therein, and finally drying the pressed fish residue.

OLAV NOTEVARP.

REFERENCES CITED

The following references are of record in the file of this patent:

UNITED STATES PATENTS

| Number | Name | Date |
|---|---|---|
| 1,840,715 | Hiller | Jan. 12, 1932 |
| 2,134,163 | Wentworth | Oct. 25, 1938 |

FOREIGN PATENTS

| Number | Country | Date |
|---|---|---|
| 423,603 | Great Britain | of 1935 |
| 448,584 | Great Britain | of 1936 |